United States Patent
Lasser

(10) Patent No.: US 10,939,146 B2
(45) Date of Patent: Mar. 2, 2021

(54) DEVICES, SYSTEMS AND METHODS FOR DYNAMICALLY SELECTING OR GENERATING TEXTUAL TITLES FOR ENRICHMENT DATA OF VIDEO CONTENT ITEMS

(71) Applicant: COMIGO LTD., Yarkona (IL)

(72) Inventor: Menahem Lasser, Kohav-Yair (IL)

(73) Assignee: Comigo Ltd., Yarkona (IL)

( * ) Notice: Subject to any disclaimer, the term of this patent is extended or adjusted under 35 U.S.C. 154(b) by 210 days.

(21) Appl. No.: 16/228,821

(22) Filed: Dec. 21, 2018

(65) Prior Publication Data
US 2019/0222869 A1    Jul. 18, 2019

Related U.S. Application Data

(60) Provisional application No. 62/618,150, filed on Jan. 17, 2018.

(51) Int. Cl.
*H04N 21/25*    (2011.01)
*H04N 21/235*    (2011.01)
(Continued)

(52) U.S. Cl.
CPC ....... *H04N 21/2353* (2013.01); *H04N 21/251* (2013.01); *H04N 21/4826* (2013.01);
(Continued)

(58) Field of Classification Search
CPC ............ H04N 21/2353; H04N 21/251; H04N 21/4826; H04N 21/8133; H04N 21/84;
(Continued)

(56) References Cited

U.S. PATENT DOCUMENTS 8,713,604 B2    4/2014 Newell
9,137,580 B2    9/2015 Scott et al.
(Continued)

FOREIGN PATENT DOCUMENTS

GB    2452519 A    3/2009
WO    2007063468 A1    6/2007
(Continued)

OTHER PUBLICATIONS

Co-pending U.S. Appl. No. 15/935,000, filed Mar. 25, 2018.
(Continued)

*Primary Examiner* — Ngoc K Vu
(74) *Attorney, Agent, or Firm* — Momentum IP; Marc Van Dyke

(57) ABSTRACT

Methods and devices for enhancing user experience while a user is watching a content item using a content playing device, by proposing and/or displaying an enrichment content item related to the content item watched by the user, where the enrichment content item is assigned a dynamic title. The dynamic title may be a different title at different instances the enrichment content item is recommended to a user. The dynamic title may be based on a connection between the content item watched by the user and the enrichment content item. The dynamic title may be automatically generated, in real time, based on such a connection, or may be selected, in real-time, from a group of pre-defined titles reflecting different aspects of the watched content item.

12 Claims, 6 Drawing Sheets

(51) Int. Cl.
*H04N 21/482* (2011.01)
*H04N 21/84* (2011.01)
*H04N 21/81* (2011.01)
*H04N 21/234* (2011.01)

(52) U.S. Cl.
CPC ......... *H04N 21/8133* (2013.01); *H04N 21/84* (2013.01); *H04N 21/23418* (2013.01)

(58) Field of Classification Search
CPC ......... H04N 21/4316; H04N 21/44008; H04N 21/4532; H04N 21/25
See application file for complete search history.

(56) References Cited

U.S. PATENT DOCUMENTS

| | | | |
|---|---|---|---|
| 9,462,342 B2 | 10/2016 | Krishnamurthy | |
| 9,639,634 B1* | 5/2017 | Greene | H04N 21/47217 |
| 10,063,910 B1* | 8/2018 | Yelton | H04N 21/4316 |
| 2007/0169148 A1 | 7/2007 | Oddo et al. | |
| 2009/0019474 A1 | 1/2009 | Robotham | |
| 2013/0031450 A1* | 1/2013 | Reese | G06Q 30/02 715/206 |
| 2015/0312633 A1 | 10/2015 | Masciarotte | |
| 2015/0334446 A1 | 11/2015 | Krikorian et al. | |
| 2016/0337609 A1 | 11/2016 | Zhou | |
| 2017/0041644 A1 | 2/2017 | Dalrymple et al. | |
| 2017/0085947 A1 | 3/2017 | Garrison et al. | |
| 2017/0243244 A1 | 8/2017 | Trabelsi et al. | |
| 2017/0251265 A1 | 8/2017 | Perez | |

FOREIGN PATENT DOCUMENTS

| | | |
|---|---|---|
| WO | 2007078846 A1 | 7/2007 |
| WO | 2012051620 A1 | 4/2012 |
| WO | 2017149447 A1 | 9/2017 |

OTHER PUBLICATIONS

Co-pending U.S. Appl. No. 16/053,106, filed Aug. 2, 2018.
Co-pending U.S. Appl. No. 16/120,972, filed Sep. 4, 2018.
Co-pending U.S. Appl. No. 16/149,175, filed Oct. 2, 2018.
Co-pending U.S. Appl. No. 16/223,149, filed Dec. 18, 2018.
Co-pending U.S. Appl. No. 16/228,821, filed Dec. 21, 2018.

* cited by examiner

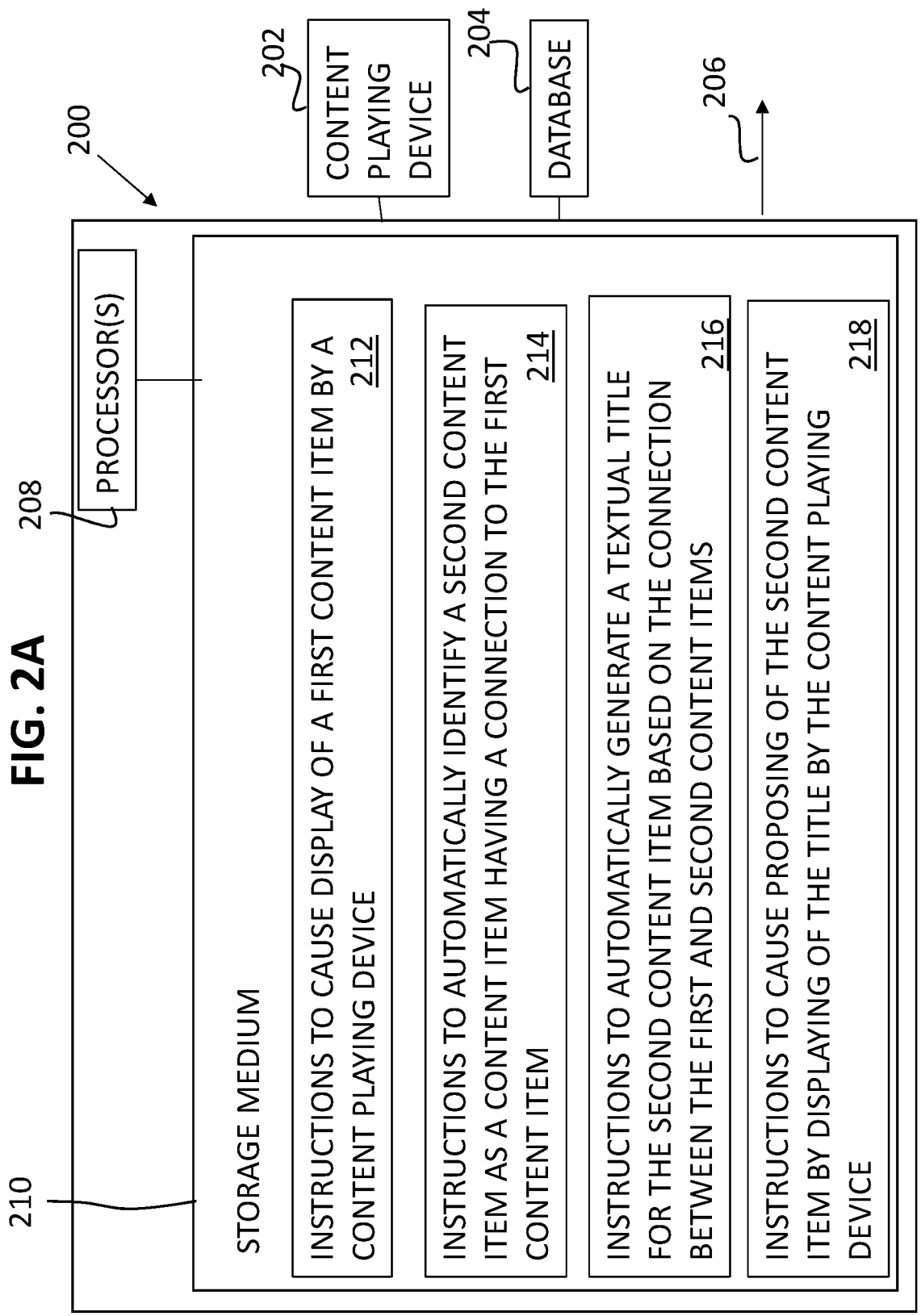

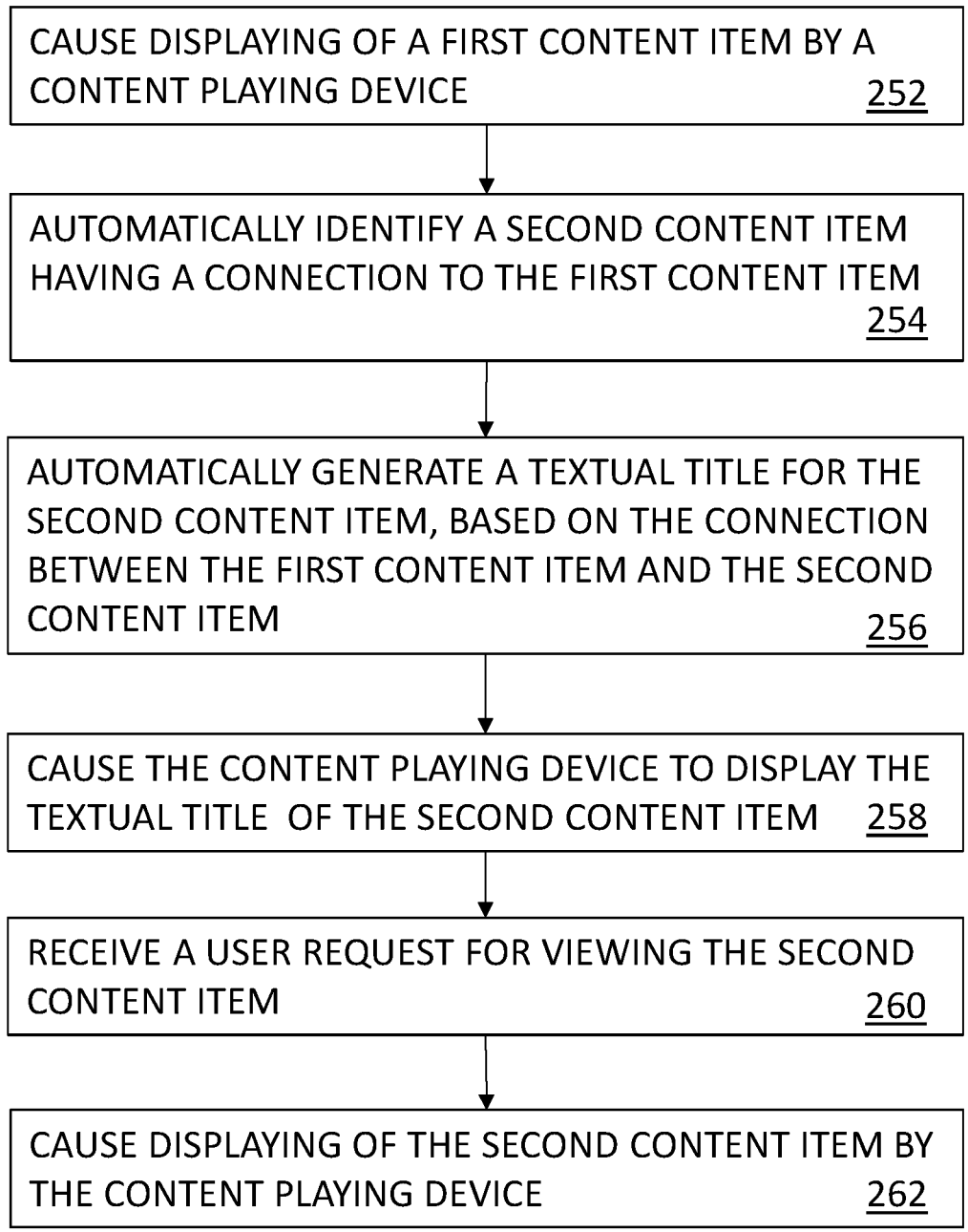

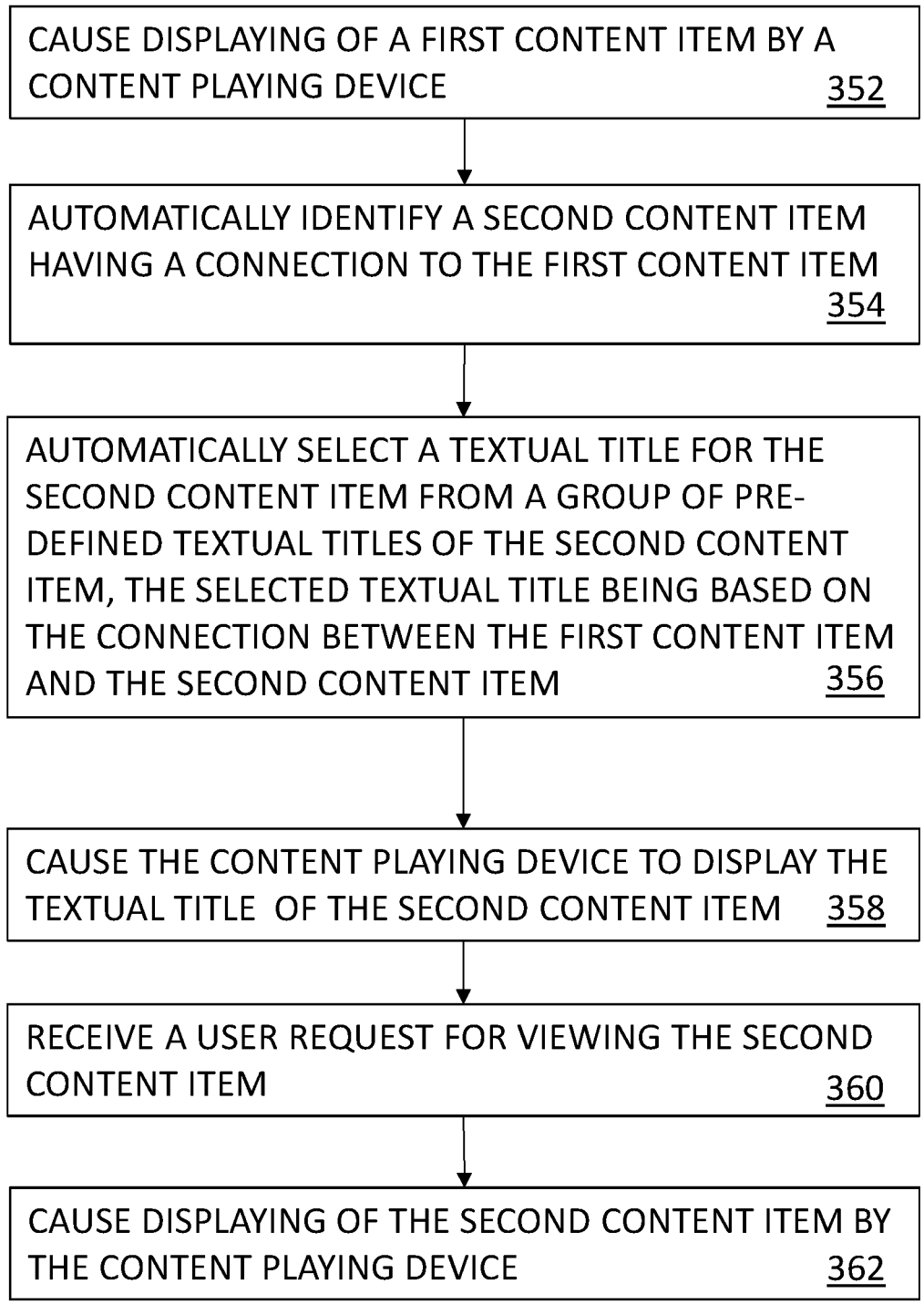

DEVICES, SYSTEMS AND METHODS FOR DYNAMICALLY SELECTING OR GENERATING TEXTUAL TITLES FOR ENRICHMENT DATA OF VIDEO CONTENT ITEMS

RELATED APPLICATION

The present application gains priority from U.S. Provisional Patent Application 62/618,150 filed Jan. 17, 2018, and entitled "Selecting a Title for Enrichment Data According to Context", which is incorporated herein by reference as if fully set forth herein.

FIELD AND BACKGROUND OF THE INVENTION

The invention, in some embodiments, relates to displaying of one or more video content items, and more particularly to methods and systems for dynamically selecting or generating textual titles for enrichment data of video content items based on a context used for selection of the enrichment items.

When television (TV) technology first became commercially available to the public, users could only consume video content at their homes under fixed, pre-determined, schedules and in a linear way. In other words, a user could only watch a movie or a news program at the time a broadcaster decided to broadcast it, and no deviation from the pre-defined program schedule was possible. The only flexibility a user had was the selection of the channel that will be displayed on the user's TV screen, thus selecting between multiple video content items that are aired at a given time.

At a later stage, Video-On-Demand (VOD) was offered to users. This service enables users to consume content not appearing on the current programs schedule, resulting in a significant increase in flexibility when deciding what to watch. Another boost in user flexibility was achieved when TV operators introduced Catch-Up TV services which not only allow a user to pick any program recently offered in the EPG (Electronic Program Guide), but also allow him to jump backward and forward in time within a specific program and to pause and resume the playing of a program.

The next step in the process of increasing user flexibility and freedom of choice when selecting what to watch was reached when some advanced Set-Top Boxes (STBs) started offering means for navigation between different content items. For example, a user currently watching a crime mystery movie set in Australia may ask the TV system to propose to him options for displaying another content item that is related to the currently watched movie, or for displaying other information related to that movie. He may then be presented with a list of options, which may, for example, include:
  a. One or more other crime mystery movies;
  b. One or more other movies in which the plot is set, or occurs, in Australia;
  c. One or more other movies having the same director as the current movie;
  d. One or more other movies which include an actor or an actress that also appears in the current movie;
  e. A review of the current movie by the New York Times;
  f. A biography of the main actress of the current movie;
  g. A still picture of the main actress of the current movie;
  h. A graphic animation that is based on the plot of the current movie;

The user may then select a content item from the list and in response will be presented with the selected content item. Content (whether media content or non-media content) that is proposed to a user based on a media content item that the user is currently watching is sometimes referred to as "enrichment data" or "content recommendations".

This linking of currently watched media content items to other related media content items and/or to other related information (non-media content items) brought user flexibility and freedom of choice to new levels not previously available.

An additional improvement with respect to a viewer's freedom of choice occurred when still more advanced STBs started proposing related content items that are related to specific portions of a currently playing media content item or are related to specific entities appearing for a short period of time in a currently playing media content item. These content items are not necessarily related to the currently played media content item as a whole. For example, a short appearance of a certain geographical location (for example the UN building in New York City) in a movie or in a news program may result in offering to the user content items that are related to that location. The user may, for example, be presented with a list of enrichment data options that includes:
  a. One or more movies whose plot (at least partially) occurs in the UN building.
  b. One or more movies whose plot (at least partially) deals with diplomatic relations between states.
  c. An article about the history of the UN organization.
  d. A biography of the current Secretary General of the UN organization.
  e. A still picture of the first Secretary General of the UN organization.

Such linking of entities embedded within media content items to other related content items further enhanced user flexibility and freedom of choice.

Provision of recommendations for content items related to what a user is currently viewing is not limited to TV systems. With more and more content viewing moving from TV screens to computer and/or phone screens, a similar development had occurred in the Internet browsing experience.

In many websites (such as YouTube, CNN, Fox News), while a user is watching a content item, he is provided with recommendations for related content items. The recommendations are presented in the form of hot links, which, when selected by the user (for example by clicking on the links), take the user to the linked content item. A link is typically shown together with a textual title (part or all of which may serve as the actual hot link). For a video content item or a still picture content item, the link may also be shown together with a thumbnail image or with a small video window.

The recommendations presented using hot links may be for other content items in the same website, as is the case when other YouTube video content items are proposed while the user is watching a currently watched YouTube video content item. Alternatively, the recommendations may include (or even consist only of) recommendations for other content items that are located in other websites. For example, some Internet news websites provide recommended links that are a mixture of links to other content items in the same website as the currently watched content item and links to content items in other news websites (see for example the news website www.vnet.co.il).

Regardless of the type of content item being watched or displayed when the presentation of the recommendations is triggered (e.g. video content item, text content item) and regardless of the type of viewing device (e.g. TV screen, computer, phone), a triggered recommendation may point to a media content item (such as a video content item or a music content item) or to a non-media content item (such as a paragraph of text).

Methods for dynamically determining entities in a playing media content item and/or determining enrichment data to be recommended or displayed to a user are disclosed in U.S. Pat. No. 9,800,951 and in U.S. Patent Application Publication Nos. 2013/0198642, 2018/0176660, 2012/0183229, 2015/0121432, 2016/0127759, 2016/0191957 and 2016/0119691, all of which are incorporated by reference, for all purposes, as if fully set forth herein.

The Problem to Solve

When proposing related content items to a user, the proposed content items must be presented in a way that that will make it clear to the user what he can expect to see if he selects a given recommendation. The common practice is to display a short text describing a proposed content item, which text is typically referred to as a "title". In many cases, the title (or a portion of it) also serves as a "hot link", that when selected by the user, for example by the user pressing a mouse button while the mouse cursor is above the hot link, indicates the user's decision or wish to view that item and causes initiation of displaying that item. If the proposed content item is an image or a video content item, commonly a thumbnail is provided near the title, which thumbnail provides extra information about the proposed content item.

For example, if the proposed content item is the freeway car chase scene from the movie "Lethal Weapon 4", it may be proposed using a title such as "Lethal Weapon 4—car chase scene" together with a thumbnail which is based on a video frame taken from that scene.

As another example, if the proposed content item is a textual news article about scandals in Hollywood, the item may be proposed using a title such as "The biggest Hollywood scandals of 2017".

In prior art systems, the title displayed for a related content item being recommended to the user is pre-defined prior to the current viewing session. Additionally, in prior art systems, the title is manually defined at the time of creation of the recommended content item, or at the time of storage thereof in the location from which it is retrieved if selected by the user.

For example, if the proposed content item is a movie that is retrieved from a VOD library of a TV operator, the title is assigned when the movie is first created, for example "Gone with the Wind". If the TV operator wants to differentiate itself from competitors by adding text in addition to the original movie title, for example "The most romantic movie ever—Gone with the Wind", the modified title is defined at the time the TV operator adds the movie to its library.

As another example, if the proposed content item is a scene from a movie that a user uploads to YouTube, for example the above-mentioned freeway car chase scene from the movie "Lethal Weapon 4", the title is assigned by the uploading user at the time of uploading. In this example, the title may be "Lethal Weapon 4—the best ever freeway car chase scene".

As a further example, if the proposed content item is a news item retrieved from a news website, for example the above-mentioned news item relating to scandals in Hollywood, the title of the proposed content item is determined or set by the reporter posting the news item in the news website, at the time of posting. For example, the title may be "Most recent big Hollywood scandals".

There exist prior art methods for automatically assigning a title to a given content item. For example:

1. Zeng et al. (https://arxiv.org/pdf/1608.07068.pdf) is an article by researchers from National Tsing Hua University and Stanford University about automatic generation of titles for user-generated videos. The approach taken in this article is to initially identify a short highlight segment of the video, and then to apply known automatic captioning methods for assigning text to the highlight segment.

2. Khameneh (http://cads.stanford.edu/projects/presentations/summer-2009/Farnaz%20-%20Automatic%20title%20generation.pdf) is a presentation by Stanford University about automatic title generation for textual items. The approach taken in this paper is to count occurrences of all words in the textual item, to identify keywords using a large corpus of background text, and to generate a title based on the identified keywords.

Even when using automatic title generation techniques as described by Zeng et al and Khameneh mentioned above, the title of a given content item is still assigned ahead of a viewing session in which it is proposed to a user as enrichment content. Consequently, a specific item will always have the same title when proposed to a user, even when the item is proposed at different viewing sessions and/or when proposed to different users.

As such, prior art systems do not provide an optimal solution which would consider not only the content being proposed to the user, but also the context in which the content is being proposed.

Consider for example a TV system, be it a smart TV or any TV fed by a smart Set-Top Box (STB), displaying a given movie, for example "Ransom", to a user. Such a system may provide the user recommendations for selecting content items that are related to the currently or recently watched content. For example, the system may propose one or more other movies in which the main actor or actress of the current movie is also participating. In the example of the movie "Ransom", the system may propose other movies in which Mel Gibson is the main actor, such as "Braveheart", "Signs", "Lethal Weapon 4", or "What Women Want".

In this scenario, in which the main reason for the user to choose the next movie may be his liking of a specific actor or actress, it makes sense to represent a proposed movie by a title which emphasizes the participation of that specific actor or actress. For example, the title "Mel Gibson in action—Lethal Weapon 4" emphasizes the presence of Mel Gibson in the proposed movie. This may be more effective in tempting the user to select the recommendation for the "Lethal Weapon 4" movie over other content items, which are also recommended on the same screen as being related to the currently watched content, for example other movies that relate to kidnapping of children, as is "Ransom".

One may argue that the TV operator may achieve the goal of "marketing" a recommendation to the user by displaying, near the pre-defined or fixed title, an explicit explanation as to why the specific recommendation is being proposed. For example, in the scenario described above, the title may be "Lethal Weapon 4", followed by the description "The movie Lethal Weapon 4 is recommended to you because Mel Gibson plays in it". However, this is cumbersome and consumes excessive screen space, which is always in short supply.

It might seem that the TV operator may improve the likelihood of a user to select a specific link by pre-assigning titles that emphasize an element that should be emphasized. For example, the operator may permanently associate with the movie "Lethal Weapon 4" the title "Mel Gibson in action—Lethal Weapon 4" rather than the simple title of the movie currently presented in prior art systems.

However, this solution is inadequate, because a movie has multiple actors and actresses in its cast, and each of them may be the reason for recommending the movie to a user. For example, suppose user A is currently watching a movie in which Hugh Grant plays, such as "Four Weddings and a Funeral", and user B is currently watching a movie in which Julia Roberts is the main actress, such as "Pretty Woman". When the TV system recommends content to user A, it includes in the recommendations several movies starring Hugh Grant, for example including the movie "Notting Hill". As discussed above, it is desirable to present the recommendation for "Notting Hill" using a title relating to the connection with Hugh Grant, such as "romantic Hugh Grant in Notting Hill". When the TV system recommends content to user B, it includes in the recommendations several movies starring Julia Roberts, for example including the movie "Notting Hill", in which Julia Roberts co-stars. In this case, it is desirable to present the recommendation for "Notting Hill" relating to the connection with Julia Roberts, for example using a title like "pretty Julia Roberts in Notting Hill". Alas, in prior art systems, a movie (or any other content item) has only a single title associated with it. As such, the movie "Notting Hill" in which both Hugh Grant and Julia Roberts star, is associated with a single title, which title will be presented to both user A and user B.

One may argue that a solution to the problem of suiting the title to the reason for selecting a specific enrichment content item, would be to assign a title that satisfies both relations at the same time, for example "romantic Hugh Grant and pretty Julia Roberts in Notting Hill". However, this is not a satisfactory solution. There are typically many actors in a movie, each of which may be the reason for recommending the movie to a user. Therefore, a title adapted to include all of the actors is likely to be very long and cumbersome, and might not sufficiently appeal to a user that is a fan of only one of the actors so as to tempt him to select this movie. Additionally, there are many aspects to a movie that may be used for generating a recommendation, in addition to, or instead of, the actors playing in the movie, as will be seen in the following examples. For example, recommendations may be based on the director, the location of filming or of occurrence, the genre, and many other characteristics. As such, it is generally impossible to find a title that covers each and every type of possible relationship or criterion used to suggest a specific content item to a user.

In another example, related content items are proposed to users if the content items are of the same genre as a currently or recently viewed content item. For example, suppose that a certain movie is an action comedy. Clearly, when recommending this movie to users who are currently watching an action movie, it is preferable to present a title emphasizing the action aspect, while when recommending the movie to users who are currently watching a comedy it is preferable to present a title emphasizing the comic aspect. Since the certain action comedy is only associated with a single title, the problem presented in the previous example is again encountered—it is possible to satisfy the needs of some users by selecting a title emphasizing one genre, but in most cases it is impossible to satisfy the needs of all users who are presented with a recommendation to choose that certain movie because of its genre.

In yet another example, related content items are proposed to users if the content items were filmed in the same geographical location as a currently or recently viewed content item. Suppose a certain movie was filmed in Alaska, starring a specific actress. Clearly, when recommending the movie to users who are currently watching movies filmed in Alaska, it is preferable to present a title emphasizing Alaska. However, the problem presented above regarding selection of a title is once again encountered, since, for an Alaska-loving user we should preferably select a title that explicitly mentions Alaska, while a title proposed to a fan of the specific actress should preferably include the name of the specific actress. As such, the need for different titles may occur even when each of the titles relates to a different aspect of the content item, and not necessarily to the content item including two different actors, being filmed in two different locations, and the like.

While the above examples dealt with TV systems and with movies as the recommended content items, the same issues also exist for Internet browsing and for recommended content items of other types. For example, while browsing the Internet, a recommended content item may be a textual news item about the 10 biggest political scandals of last year, where each of the 10 scandals is associated with a different politician. Each of the 10 politicians mentioned in the news item may be the reason for recommending this news item to the user, depending on which of the politicians is mentioned in a currently displayed news item. Again, no single title is suitable for all 10 different reasons for which the item may be recommended.

As such, assignment of a single title to a content item, even if customized for use when presenting a recommendation under some circumstances, cannot satisfy the requirements for such a title under all possible circumstances.

There is thus a need in the art for a method and a system for dynamically selecting or generating a textual title for an enrichment content item of video content items, based on a context used for selection of the enrichment content item. In other words, there is a need in the art for a method and system for associating different titles with a single content item, and selecting one of the titles, in real time, based on the reason for which the content item is being proposed to the user.

SUMMARY OF THE INVENTION

Some embodiments of the invention relate to displaying of video content, and more particularly to methods and systems for dynamically selecting or generating titles for enrichment data of video content items, based on a context used for selecting the enrichment data, or on a relationship between the enrichment data and the video content items.

According to an aspect of a first embodiment of the invention, there is provided a method for enhancing user experience of users consuming content items using content playing devices, the method including:

a) causing displaying a first content item by a first content playing device;
b) during the displaying of the first content item by the first content playing device:
  i) automatically identifying a second content item as a content item having a first connection to the first content item, ii) automatically determining a first textual title for the second content item, and iii) causing proposing the second content item to a first of the users, the proposing including displaying the first textual title by the first content playing device;

c) causing displaying a third content item by a second content playing device; and d) during the displaying of the third content item by the second content playing device:

i) automatically identifying the second content item as a content item having a second connection to the third content item, ii) automatically determining a second textual title for the second content item, the second textual title being different from the first textual title, and iii) causing proposing the second content item to a second of the users, the proposing including displaying the second textual title by the second content playing device.

In some embodiments, the first content playing device and the second content playing device are the same content playing device. In other embodiments, the second content playing device is different from the first content playing device.

In some embodiments, the first of the users and the second of the users are the same user. In other embodiments, the first of the users and the second of the users are different users.

In some embodiments, the method further includes at least one step selected from a group consisting of:

i) during the displaying of the first content item by the first content playing device and subsequent to the displaying of the first textual title by the first content playing device, in response to the first of the users requesting the second content item, causing displaying the second content item by the first content playing device, and ii) during the displaying of the third content item by the second content playing device and subsequent to the displaying of the second textual title by the second content playing device, in response to the second of the users requesting the second content item, causing displaying the second content item by the second content playing device.

In some embodiments, at least one statement selected from a group consisting of the following statements is true:

i) the automatically determining of the first textual title for the second content item is based on the first connection, and ii) the automatically determining of the second textual title for the second content item is based on the second connection.

In some embodiments, at least one statement selected from a group consisting of the following statements is true:

i) the automatically determining of the first textual title includes automatically selecting the first textual title from a group of multiple textual titles for the second content item, and ii) the automatically determining of the second textual title includes automatically selecting the second textual title from the group of multiple textual titles for the second content item.

In some embodiments, at least one statement selected from a group consisting of the following statements is true:

i) the automatically determining of the first textual title includes automatically generating the first textual title during the displaying of the first content item by the first content playing device, and ii) the automatically determining of the second textual title includes automatically generating the second textual title during the displaying of the third content item by the second content playing device.

In some such embodiments, at least one statement selected from a group consisting of the following statements is true:

i) the automatically generating of the first textual title includes automatically changing a default textual title according to a rule associated with the first connection, and ii) the automatically generating of the second textual title includes automatically changing the default textual title according to a rule associated with the second connection.

In some embodiments, the first, second and third content items are video content items, and at least one connection selected from a group consisting of the first connection and the second connection is selected from a group consisting of:

A) sharing a common actor or a common actress,
B) sharing a common director,
C) sharing a common location of filming,
D) sharing a common plot location, and
E) sharing a common genre.

In some embodiments, the first and the third content items are first and third video content items, and at least one connection selected from a group consisting of the first connection and the second connection is selected from a group consisting of:

A) a connection between the second content item and the first or the third video content item as a whole,
B) a connection between the second content item and a scene of the first or the third video content item, and
C) a connection between the second content item and a named entity appearing in the first or the third video content item.

In some embodiments, at least one content playing device selected from a group consisting of the first content playing device and the second content playing device includes a TV system, and at least one content item selected from a group consisting of the first content item, the second content item and the third content item is a media content item.

In some embodiments, at least one user selected from a group consisting of the first and the second of the users is consuming at least one content item selected from a group consisting of the first content item and the third content item while browsing the Internet, and at least one content item selected from a group consisting of the first content item, the second content item and the third content item is a non-media content item.

According to another aspect of the first embodiment of the invention, there is provided a device for enhancing user experience of users consuming content items using content playing devices, the device including:

a) one or more processors in communication with the content playing devices; and b) a non-transitory computer readable storage medium for instructions execution by the one or more processors, the non-transitory computer readable storage medium having stored:

i) instructions to cause displaying a first content item by a first content playing device;

ii) instructions, to be executed during the displaying of the first content item by the first content playing device, including:

(1) instructions to automatically identify a second content item as a content item having a first connection to the first content item,
(2) instructions to automatically determine a first textual title for the second content item, and
(3) instructions to cause proposing the second content item to a first of the users, the proposing including displaying the first textual title by the first content playing device;

iii) instructions to cause displaying a third content item by a second content playing device; and iv) instructions, to be executed during the displaying of the third content item by the second content playing device, including:
(1) instructions to automatically identify the second content item as a content item having a second connection to the third content item,
(2) instructions to automatically determine a second textual title for the second content item, the second textual title being different from the first textual title, and
(3) instructions to cause proposing the second content item to a second of the users, the proposing including displaying the second textual title by the second content playing device.

In some embodiments, the one or more processors are in direct communication with at least some of the content playing devices. In other embodiments, the one or more processors are in indirect communication with at least some of the content playing devices, and communicate with those content playing devices via corresponding other devices, for example via corresponding Set-Top Boxes.

According to an aspect of a second embodiment of the invention, there is provided a method for enhancing user experience while a user is consuming content items using a content playing device, the method including:

a) causing displaying a first content item by the content playing device;
b) during the displaying of the first content item by the content playing device:
   i) automatically identifying a second content item as a content item having a connection to the first content item,
   ii) subsequent to the automatically identifying the second content item, automatically generating a textual title for the second content item, the textual title being based on the connection between the second content item and the first content item, and
   iii) causing proposing the second content item to the user, the proposing including displaying the textual title by the content playing device.

In some embodiments, the method further includes during the displaying of the first content item by the content playing device and subsequent to the displaying of the textual title by the content playing device, in response to the user requesting the second content item, causing displaying the second content item by the content playing device.

In some embodiments, the automatically generating of the textual title includes automatically changing a default textual title according to a rule associated with the connection between the second content item and the first content item.

In some embodiments, the first and second content items are video content items, and the connection between the second content item and the first content item is selected from a group consisting of:
A) sharing a common actor or a common actress,
B) sharing a common director,
C) sharing a common location of filming,
D) sharing a common plot location, and
E) sharing a common genre.

In some embodiments, the first content item is a video content item, and the connection between the second content item and the first content item is selected from a group consisting of:
A) a connection between the second content item and the video content item as a whole,
B) a connection between the second content item and a scene of the video content item, and
C) a connection between the second content item and a named entity appearing in the video content item.

In some embodiments, the content playing device includes a TV system, and at least one content item selected from a group consisting of the first content item and the second content item is a media content item.

In some embodiments, the user is consuming the first content item while browsing the Internet, and at least one content item selected from a group consisting of the first content item and the second content item is a non-media content item.

According to another aspect of the second embodiment of the invention, there is provided a device for enhancing user experience while a user is consuming content items using a content playing device, the device including:

a) one or more processors in communication with the content playing device; and
b) a non-transitory computer readable storage medium for instructions execution by the one or more processors, the non-transitory computer readable storage medium having stored:
   i) instructions to cause displaying a first content item by the content playing device;
   ii) instructions, to be executed during the displaying of the first content item by the content playing device, including:
      (1) instructions to automatically identify a second content item as a content item having a connection to the first content item,
      (2) instructions, to be executed subsequent to execution of the instructions to automatically identify the second content item, to automatically generate a textual title for the second content item, the textual title being based on the connection between the second content item and the first content item, and
      (3) instructions to cause proposing the second content item to the user, the proposing including displaying the textual title by the content playing device.

In some embodiments, the one or more processors are in direct communication with the content playing device. In other embodiments, the one or more processors are in indirect communication with the content playing device, and communicate with the content playing device via at least one other device, for example via a Set-Top Box.

According to an aspect of a third embodiment of the invention, there is provided a method for enhancing user experience while a user is consuming content items using a content displaying device, the method including:

a) causing displaying a first content item by the content playing device;
b) during the displaying of the first content item by the content playing device:

i) automatically identifying a second content item as a content item having a connection to the first content item, ii) subsequent to the automatically identifying the second content item, automatically selecting a textual title for the second content item from a group of multiple textual titles associated with the second content item, wherein the automatically selecting is based on the connection between the second content item and the first content item, and iii) causing proposing the second content item to the user, the proposing including displaying the textual title by the content playing device.

In some embodiments, each of the textual titles in the group of multiple textual titles is defined prior to the displaying of the first content item.

In some embodiments, the method further includes, during the displaying of the first content item by the content playing device and subsequent to the displaying of the textual title by the content playing device, in response to the user requesting the second content item, causing displaying the second content item by the content playing device.

In some embodiments, the first and second content items are video content items, and the connection between the second content item and the first content item is selected from a group consisting of:

A) sharing a common actor or a common actress,
B) sharing a common director,
C) sharing a common location of filming,
D) sharing a common plot location, and
E) sharing a common genre.

In some embodiments, the first content item is a video content item, and the connection between the second content item and the first content item is selected from a group consisting of:

A) a connection between the second content item and the video content item as a whole,
B) a connection between the second content item and a scene of the video content item, and
C) a connection between the second content item and a named entity appearing in the video content item.

In some embodiments, the content playing device includes a TV system, and at least one content item selected from a group consisting of the first content item and the second content item is a media content item.

In some embodiments, the user is consuming the first content item while browsing the Internet, and at least one content item selected from a group consisting of the first content item and the second content item is a non-media content item.

According to another aspect of the third embodiment of the invention, there is provided a device for enhancing user experience while a user is consuming content items using a content playing device functionally associated with the device, the device including:

a) one or more processors in communication with the content playing device; and b) a non-transitory computer readable storage medium for instructions execution by the one or more processors, the non-transitory computer readable storage medium having stored:

i) instructions to cause displaying a first content item by the content playing device;

ii) instructions, to be executed during the displaying of the first content item by the content playing device, including:

(1) instructions to automatically identify a second content item as a content item having a connection to the first content item, (2) instructions, to be executed subsequent to execution of the instructions to automatically identify the second content item, to automatically select a textual title for the second content item from a group of multiple textual titles associated with the second content item, wherein the automatically selecting is based on the connection between the second content item and the first content item, and (3) instructions to cause proposing the second content item to the user, the proposing including displaying the textual title by the content playing device.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 2A is a schematic block diagram of an embodiment of a device for selecting enrichment data and a title therefor according to a second embodiment of the teachings herein;

FIG. 2B is a flow chart of a method for selecting enrichment data and a title therefor according to the second embodiment of the teachings herein;

FIG. 3B is a flow chart of a method for selecting enrichment data and a title therefor according to the third embodiment of the teachings herein.

DESCRIPTION OF SOME EMBODIMENTS OF THE INVENTION

Figure 1A:
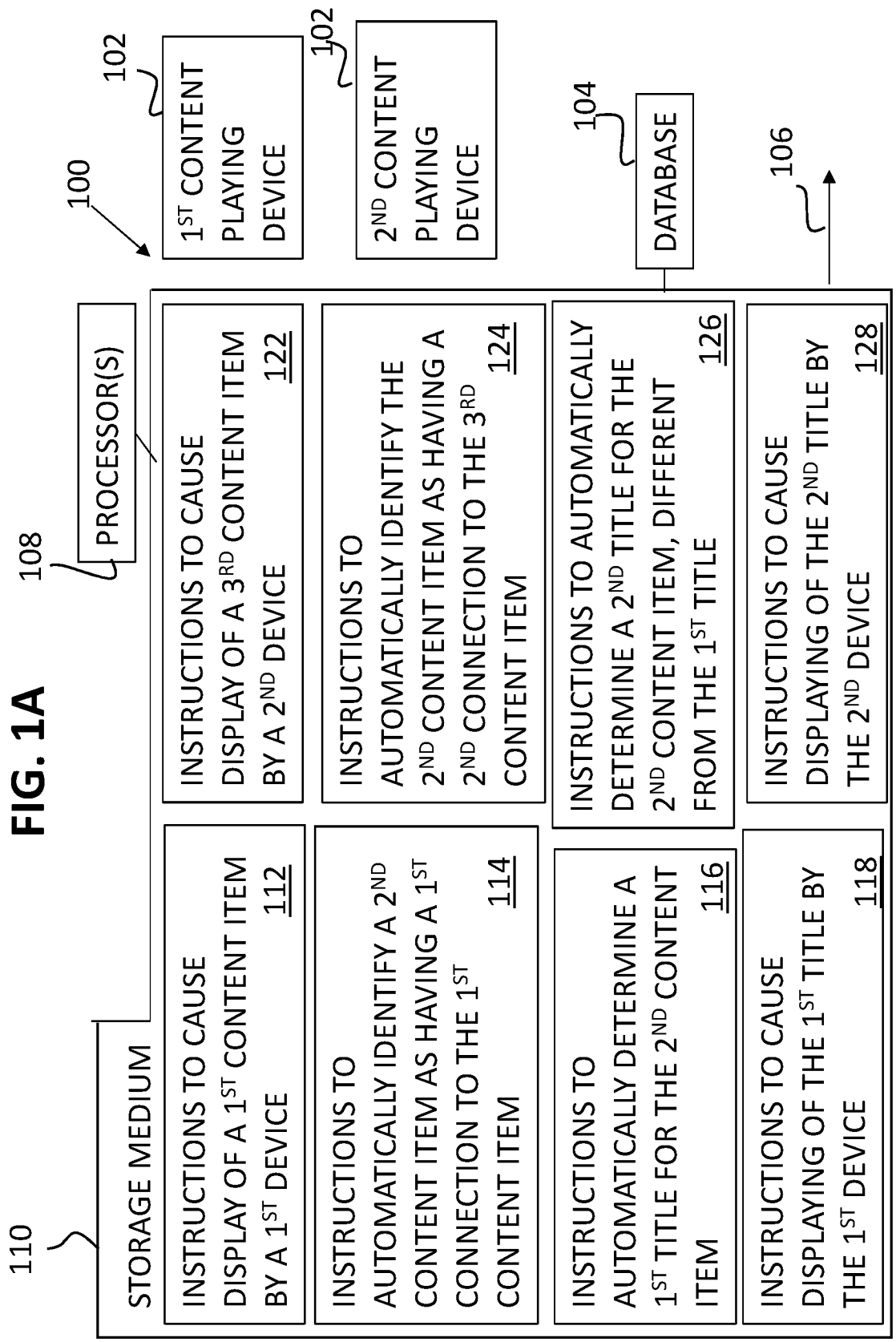
FIG. 1A is a schematic block diagram of an embodiment of a device for selecting enrichment data and a title therefor according to a first embodiment of the teachings herein.

It is a goal of the present invention to support multiple titles for a single content item. Moreover, a specific one of the multiple titles to be used in a specific recommendation being presented to the user is selected or generated at run-time, and may depend on the specific reason for presenting the recommendation for the content item.

In one embodiment, termed "a title selection embodiment", an offline process prepares a set of multiple titles for a single content item, where each title is suitable for a certain type of relation between the single content item and a content item currently being watched, or which has recently been watched. For example, if a certain movie entitled "The Simon Brothers" is a comic thriller starring Clint Eastwood and Jamie Lee Curtis, and was filmed partly in Hawaii and partly in San Francisco, then at least the following titles may be prepared in advance for "The Simon Brothers":

a. A title emphasizing the comic aspect, for example "Laugh with the Simon Brothers";
b. A title emphasizing the thriller aspect, for example "Hold your breath with the Simon Brothers";
c. A title emphasizing the participation of Clint Eastwood, for example "Clint Eastwood in action in The Simon Brothers";
d. A title emphasizing the participation of Jamie Lee Curtis, for example "Impressive Jamie Lee Curtis in The Simon Brothers";
e. A title emphasizing the Hawaii location, for example "See Hawaii with the Simon Brothers"; and
f. A title emphasizing the San Francisco location, for example "Walk the streets of San Francisco with the Simon Brothers".

When that certain movie is included in a list of content items recommended to a user who is currently watching another movie, one title from the pre-defined list of titles available for that certain movie is automatically selected by the system, and is used for presenting the recommendation. The title selection is carried out in real-time, as part of the preparation of the list of recommendations. After deciding that the certain movie should be included in the list of recommended content items, the system determines the type of relation that caused this recommendation to be presented—Was it because it is a comedy? Was it because it is a thriller? Was it because of the participation of Clint Eastwood? Was it because of the participation of Jamie Lee Curtis? Was it because of the Hawaii location? Was it because of the San Francisco location? Depending on the reason for selecting the movie to be suggested to the user, the relevant title from the list of pre-defined titles, which is associated with that reason, is selected for display.

Optionally, the system may also have a default title, to be used when the type of relation causing the inclusion of this content item in the list of recommendations was not one for which there is a pre-defined matching title. The default title may be an additional title, not assigned to any specific relation type, or may be one of the pre-defined titles, corresponding to some type of relation, that additionally serves as a default title.

Optionally, multiple relation types may correspond to a single common title. For example, a title mentioning the name of a given actor together with the name of the movie's plot location may be used as the most appropriate title for recommendations based on the identity of the given actor and for recommendations based on the movie's plot location.

Optionally, it is possible that at different times, at which a certain content item is proposed based on a certain reason, it will be represented by different title. For example, the set of pre-assigned titles of the certain content item may contain multiple titles corresponding to the same actor, and when that actor is the reason for proposing the certain content item, one of the multiple titles appropriate for that certain actor is randomly selected. Alternatively, the selection between the multiple titles appropriate for use when the actor is the reason for proposing the content item is in accordance with some non-random consideration, such as based on use of turns of the different titles, based on a time of day, based on user demographic data, or based on user preferences.

The offline selection of the multiple titles and the corresponding reasons of inclusion in the recommendation list may be accomplished either manually, or by using any of the methods disclosed in the prior art for automatic generation of titles, such as the methods described by Zeng et al. (https://arxiv.org/pdf/1608.07068.pdf) and/or by Khameneh (http://cads.stanford.edu/projects/presentations/summer-2009/Farnaz%20-%20Amomatic%20title%20generation.pdf), both of which are incorporated by reference as if fully set forth herein.

In another embodiment, termed "a title generation embodiment", there is no offline preparation of titles in advance, with the possible exception of a default title, and the most appropriate title for a given reason for recommendation of the content item is generated in real-time, following determination of the reason for recommendation. When the reason for recommending a given content item is determined, for example based on an actor, a director, a location, etc., the system automatically generates a title that emphasizes the determined reason.

In a first implementation of the title generation embodiment, the system generates the appropriate title in real-time by customizing the default title, which is neutral with respect to the reason for recommendation of the content item, to match the determined reason for recommendation. Such customizing may be based on pre-defined rules or templates. For example, a rule for customizing a title when the recommendation is based on a given actor may be—'for a default title <def-title> and a given actor <actor-name>, generate a customized title in the form "See <actor-name> in action in <def-title>"'. As such, for a movie with the default title "The Simon Brothers" including actor "Clint Eastwood", the customized title will be "See Clint Eastwood in action in The Simon Brothers". As another example, a rule for customizing a title when the recommendation is based on a comic genre may be—'for a default title <def-title>, generate a customized title in the form "Laugh with <def-title>"'. As such, for a movie with the default title "The Simon Brothers", the customized title will become "Laugh with The Simon Brothers".

In a second implementation of the title generation embodiment, the system generates the appropriate title using real-time processing of the content and metadata of the recommended content item, without necessarily relying on a pre-defined default title. Any method known in the prior art for automatically generating titles for content items may be used, with the additional requirement that the term identifying the recommendation reason, for example an actor name, a director name, a genre, and the like, must be reflected in the generated title.

The list of reasons for including a content item in the list of proposed content items, for which rules or templates for customizing titles are generated in the first implementation of the title generation embodiment, may be the same as listed for the title selection embodiment. For each such reason the customization process may result in a different title. Other details and options disclosed for the title selection embodiment are also applicable for the title generation embodiment, regardless of the chosen implementation.

Additional embodiments are possible, which combine the title selection embodiment and the title generation embodiment. Some parts of the title generation process are carried out offline, in advance, while the rest of the title generation process is carried out in real-time, following the determination of the reason for recommendation of the content item. In all such hybrid embodiments, at least some portion of the title generation process is carried out in advance, and at least some portion of the title generation process is carried out in real-time.

In accordance with a further embodiment, termed "the instance dependent title embodiment", the system may propose different titles at different instances the recommendation is presented. This may occur, for example, if the reason for inclusion of the content item in the recommendation list is different at the different instances, or if the system presents at one instance the default title and at another instance a title including the reason for inclusion of the content item in the recommendation list. In some cases, different titles may be presented to different users. In some cases, different titles may be presented to the same user at different times at which the recommendation is presented to that user, based on the different reasons for the recommendations that are related to the different content items the user is viewing at each of those different times.

Even though the above explanations focus on cases in which the system automatically provides recommendations to the user without being requested to do so, the proposed solution is equally applicable to cases in which the user explicitly requests the system to provide recommendations for related content. In both cases the system automatically identifies or determines the reason for displaying each of the recommended content items, and that reason is used for selecting or generating the corresponding preferred title.

It will be appreciated that the content items in a given list of recommended content items displayed to a user may be included in that list for different types of reason. For example, when accessing a database of video items such as YouTube, the user may automatically be presented with a list of recommended video items, during or after the time of watching a current video item. One item in the list of recommended video items may be proposed because it has the same director as the watched item and is represented by a title emphasizing the director, a second item in the list may be proposed because it has the same main actor as the watched item and is represented by a title emphasizing that actor, a third item in the list may be proposed because it is of the same genre as the watched item and is represented by a title emphasizing that genre, and so on.

The explanations provided above focus on cases in which the relation of a recommendation to the currently watched content item, or the reason for selecting a specific content item to be recommended, is based on the currently watched content item as a whole, for example recommending an item that is of the same genre as the currently watched movie. However, the proposed solution is equally applicable to cases in which the relation of the recommendation to the currently watched content item or the reason for selecting the specific content item to be recommended is based only on a portion of the content item being watched, or even on a single scene of the currently watched content item. For example, a car chasing content item may be recommended when the currently watched scene within the currently watched content item is a car chase. Similarly, the proposed solution is equally applicable to cases in which the relation of the recommendation to the currently watched content item is a relation to a named entity appearing in the currently watched content item. For example, a textual biography of a celebrity whose name appears as a named entity in the currently watched scene of the currently watched content item may be recommended during or following watching of this scene.

As such, an innovation of the proposed solution is the ability to use multiple titles in multiple instances of recommending the same content item. Specifically, the generation or selection of the specific title to use in a specific instance is carried out in real-time during the current viewing session.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the examples. The invention can be implemented with other embodiments and can be practiced or carried out in various ways. It is also understood that the phraseology and terminology employed herein is for descriptive purpose and should not be regarded as limiting.

Reference is now made to FIG. 1A, which is a schematic block diagram of an embodiment of a device for selecting enrichment data and a title therefor according to a first embodiment of the teachings herein.

As seen in FIG. 1A, a device 100 for selecting enrichment data and a title therefor is functionally associated with one or more content playing devices 102, here illustrated as two content playing devices. The content playing device(s) 102 may be any suitable content playing device(s), such as a television screen, a computer screen, a projector projecting video content onto a wall or a pull-down projector screen, and the like. Different playing devices 102 may be associated with different users, for example with different subscribers of a TV service.

In some embodiments, the device 100 may be, or may include, a Set-Top Box. In some embodiments, the device 100 may be, or may include, a smart TV, in which case the content playing device, or one of the content playing devices, may be the screen of the smart TV. In some embodiments, one or more content playing devices 102 may be, or may include, a corresponding Set-Top Box. In some embodiments, one or more content playing devices 102 may be, or may include, a corresponding smart TV.

In some embodiments, device 100 may be functionally associated with one or more databases 104 including content suitable for providing as enrichment data, such as a database of sports statistics suitable for providing as enrichment content, a database including biographical information and images of actors and actresses, a video clip database, and the like. In some embodiments, device 100 may be connected to, or form part of, a network which can be searched for enrichment data, such as the Internet, as indicated by arrow 106.

Device 100 includes a processor 108 and a storage medium 110, which is typically a non-transitory computer readable storage medium.

Processor 108 is in communication with the content playing device(s) 102.

In some embodiments, the processor may be in direct communication with the content playing device(s) 102. For example, when device 100 is a smart TV and the content playing device 102 is a screen of the smart TV, the processor 108 is in direct communication with the content playing device. As another example, the device 100 may be a Set-Top Box, which is in direct communication with a content playing device 102 to which it provides content.

In some embodiments, the processor may be in indirect communication with the content playing device(s) 102, or may communicate with the content playing device(s) via one or more intermediate devices. For example, when device 100 is a server, the processor may communicate with content playing devices 102 via Set-Top Boxes corresponding to each of the content playing devices 102, which Set-Top Boxes function as intermediate devices.

The storage medium 110 includes instructions to be executed by the processor 108, in order to carry out various steps of the method described herein below with respect to FIG. 1B. Specifically, the storage medium includes the following instructions:

instructions 112, that when executed by processor 108, cause displaying of a first content item by a first content playing device 102;

instructions 114, that when executed by processor 108, automatically identify a second content item as having a first connection to the first content item;

instructions 116, that when executed by processor 108, automatically determine a first textual title for the second content item;

instructions 118, that when executed by processor 108, cause proposing the second content item to a first user consuming content items using the first content playing device, which proposing includes displaying the first textual title by the first content playing device;

instructions 122, that when executed by processor 108, cause displaying of a third content item by a second content playing device 102;

instructions 124, that when executed by processor 108, automatically identify the second content item as having a second connection to the third content item;

instructions 126, that when executed by processor 108, automatically determine a second textual title for the second content item, the second textual title being different from the first textual title determined by instructions 116; and instructions 128, that when executed by processor 108, cause proposing the second content item to a second user consuming content items using the second content playing device, which proposing includes displaying the second textual title by the second content playing device.

In some embodiments, the processor 108 executes the instructions 114, the instructions 116, and the instructions 118 simultaneously with the displaying of the first content item by the first content playing device caused by the execution of the instructions 112. Stated differently, in some embodiments, the second content item is identified as being connected to the first content item, a first title for the second content item is determined, and the second content item is proposed to the first user, are all done during the displaying of the first content item.

Similarly, in some embodiments, the processor 108 executes the instructions 124, the instructions 126, and the instructions 128 simultaneously with the displaying of the third content item by the second content playing device caused by the execution of the instructions 122. Stated differently, in some embodiments, the second content item is identified as being connected to the third content item, a second title for the second content item is determined, and the second content item is proposed to the second user, are all done during the displaying of the third content item.

In some embodiments, the first and second content playing devices are different devices. In other embodiments, the first and second content playing devices are a single content playing device, such that instructions 112, 114, 116, and 118 are carried out by processor 108 at a first time, and instructions 122, 124, 126, and 128 are carried out by processor 108 at a second time, using the same content playing device.

In some embodiments, the first and second user are two different users. In other embodiments, the first and second users are the same user.

The second content item determined when instructions 114 and/or 124 are executed by processor 108, may be any suitable type of content item, and may include video data, an audio clip, textual data, a still picture, and/or a graphic animation.

In some embodiments, storage medium 110 includes additional instructions (not explicitly shown) to be executed by the processor 108, to cause displaying of the second content item by the first content playing device in response to the first user requesting the second content item, for example by providing, subsequent to the displaying of the first title caused by executing instructions 118, a suitable command to processor 108 via a remote controller. The processor 108 executes the additional instructions to cause displaying of the second content item by the first content playing device during, or subsequent to, the displaying of the first content item and subsequent to execution of instructions 118. Stated differently, the processor causes the first content playing device to play the second content item following receipt of a suitable user command, during, or subsequent to, the displaying of the first content item and after displaying of the first textual title of the second content item.

In some embodiments, storage medium 110 includes additional instructions (not explicitly shown) to be executed by the processor 108, to cause displaying of the second content item by the second content playing device in response to the second user requesting the second content item, for example by providing, subsequent to the displaying of the second title caused by executing instructions 128, a suitable command to processor 108 via a remote controller. The processor 108 executes the additional instructions to cause displaying of the second content item by the second content playing device during, or subsequent to, the displaying of the first content item and subsequent to execution of instructions 128. Stated differently, the processor causes the second content playing device to play the second content item following receipt of a suitable user command, during, or subsequent to, the displaying of the third content item and after displaying of the second textual title of the second content item.

In some embodiments, the instructions 116 include instructions to automatically determine the first textual title for the second content item based on the first connection between the first content item and the second content item.

In some embodiments, the instructions 126 include instructions to automatically determine the second textual title for the second content item based on the second connection between the third content item and the second content item.

In some embodiments, the instructions 116 include instructions to automatically select the first textual title for the second content item from a group of multiple pre-defined textual titles for the second content item. In some embodiments, the instructions 126 include instructions to automatically select the second textual title for the second content item from the group of multiple pre-defined textual titles.

In some embodiments, the instructions 116 include instructions to automatically generate the first textual title for the second content item in real-time, during displaying of the first content item. In some such embodiments, the instructions 116 include instructions to automatically change a default textual title associated with the second content item according to a rule associated with the first connection between the first content item and the second content item.

In some embodiments, the instructions 126 include instructions to automatically generate the second textual title for the second content item in real-time, during displaying of the third content item. In some such embodiments, the instructions 126 include instructions to automatically change the default textual title associated with the second content item according to a rule associated with the second connection between the third content item and the second content item.

In some embodiment, the content playing device(s) 102 may be part of a TV system, such that the first content item, the second content item, and/or the third content item are media content items.

Figure 1B:
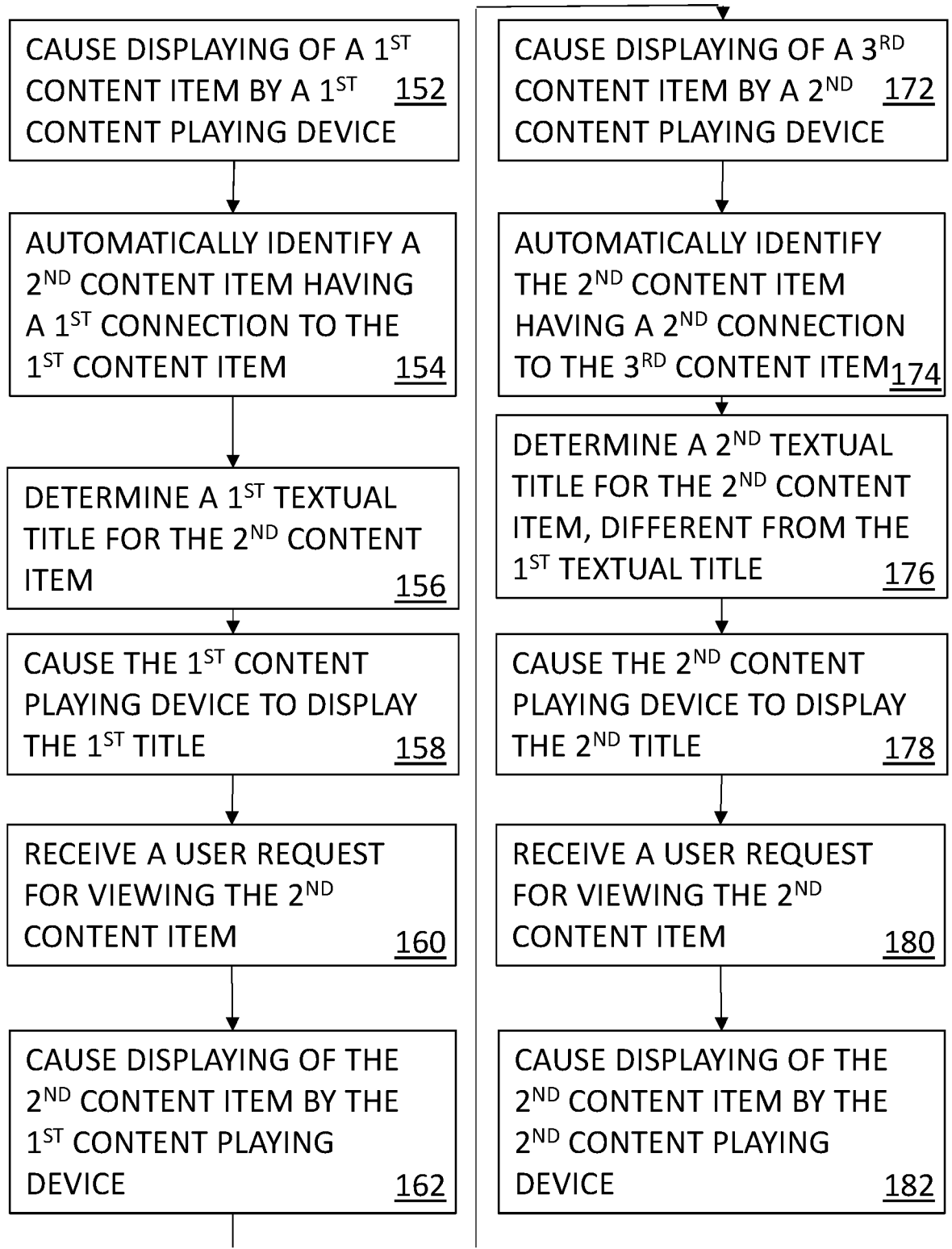
FIG. 1B is a flow chart of a method for selecting enrichment data and a title therefor according to the first embodiment of the teachings herein.

A method for selecting enrichment data and a title therefor according to the first embodiment of the teachings herein, using the device of FIG. 1A, is now described with respect to FIG. 1B.

As seen, at step 152, processor 108 of device 100 executes instructions 112, and causes displaying of a first content item by a first content playing device 102. In some embodiment, the first content item is a media content item. In some embodiments, the first content item is a non-media content item, for example displayed while the user is browsing the Internet. For example, at step 152, processor 108 may cause a television in Ruth's den (first content playing device 102) to display the movie "Mary Poppins".

At step 154, which takes place during displaying of the first content item by the first content playing device, processor 108 executes instructions 114 and automatically identifies a second content item as a content item having a first connection to the first content item. The identification of the second content item may be carried out using any method known in the art, such as the methods described in U.S. Pat. No. 9,800,951 and in U.S. Patent Application Publication Nos. 2013/0198642, 2018/0176660, 2012/0183229, 2015/0121432, 2016/0127759, 2016/0191957 and 2016/0119691, all of which are incorporated by reference, for all purposes, as if fully set forth herein.

The second content item identified at step 154 may be any suitable content item, and may include video data, an audio clip, textual data, a still picture, and/or a graphic animation.

In some embodiments, the first and second content items are video content items, and the first connection between the first and second content items is selected from the group consisting of:
  A) sharing a common actor or a common actress,
  B) sharing a common director,
  C) sharing a common location of filming,
  D) sharing a common plot location, and
  E) sharing a common genre.

In some embodiments, the first content item is a video content item, and the connection between the first and second content items is selected from a group consisting of:
  A) a connection between the second content item and the first video content item as a whole,
  B) a connection between the second content item and a scene of the first video content item, and
  C) a connection between the second content item and a named entity appearing in the first video content item.

In the present example, the processor may identify the movie "Notting Hill" as a second content item, because both "Mary Poppins" and "Notting Hill" are set in London. As such, in the present example, the connection between the first content item and the second content item is that both content items are set in the same location.

At step 156, which takes place during displaying of the first content item by the first content playing device, processor 108 executes instructions 116 and automatically determines a first textual title for the second content item.

In some embodiments, the automatic determination of the first textual title at step 156 is based on the first connection between the first content item and the second content item. In the present example, in which the first connection is the shared setting location of London, the first textual title may be "Tour London in 'Notting Hill'".

In some embodiments, the automatic determination of the first textual title at step 156 includes automatically selecting the first textual title from a group of multiple textual titles for the second content item. In some embodiments, each textual title in the group relates to an aspect of the second content item which may form a connection with other content items. In the present example, the group may include the textual titles:

"Tour London in 'Notting Hill'" ("Notting Hill" is set in London);

"Beautiful Julia Roberts stars in 'Notting Hill'" (Julia Roberts stars in "Notting Hill");

"Richard Curtis's creativity in 'Notting Hill'" (the screenplay of "Notting Hill" is written by Richard Curtis);

"Comic relief with 'Notting Hill'" ("Notting Hill" is a romantic comedy);

"Fall in love with 'Notting Hill'" ("Notting Hill" is a romantic comedy); and

"Handsome Hugh Grant in 'Notting Hill'" (Hugh Grant stars in "Notting Hill").

In some embodiments, the automatic determination of the first textual title at step 156 includes automatically, and in real-time—i.e. during displaying of the first content item, generating the first textual title. In some such embodiments, the first textual title may be generated based on a rule associated with the first connection between the first and second content items. In the present example, in which the second content item "Notting Hill" is selected based on the shared setting location with the first content item "Mary Poppins", the rule may be "for a content item named <item_name> set in a location <location_name>, generate the title 'Tour <location_name> in <item_name>', and the resulting title would be "Tour London in 'Notting Hill'".

At step 158, which takes place during displaying of the first content item by the first content playing device, processor 108 executes instructions 118 and causes the first content playing device to display the first textual title for the second content item, thereby to propose the second content item to the first user.

In the present example, processor 108 would cause the television in Ruth's den (first content playing device 102) to display the generated recommendation "Tour London in "Notting Hill"".

In some embodiments, at step 160, processor 108 receives a user request from the first user for viewing the second content item. In the present example, Ruth may press a button on a remote controller associated with the TV in her den, selecting the recommendation to watch "Notting Hill".

Subsequently, at step 162, processor 108 causes displaying of the second content item by the first content playing device. In the present example, the TV in Ruth's den would proceed to play "Notting Hill".

As seen, at step 172, processor 108 of device 100 executes instructions 122, and causes displaying of a third content item by a second content playing device 102. In some embodiment, the first content item is a media content item. In some embodiments, the first content item is a non-media content item, for example displayed while the user is browsing the Internet.

In some embodiments, the first content playing device and the second content playing device are the same content playing device. Returning to the present example, the processor may cause the television in Ruth's den to display the movie "Pretty Woman".

In other embodiments, the first content playing device is different from the second content playing device. In the present example, the processor may cause the television in Ruth's bedroom (second content playing device) to display the movie "Pretty Woman".

At step 174, which takes place during displaying of the third content item by the second content playing device, processor 108 executes instructions 124 and automatically identifies the second content item identified at step 154 as a content item having a second connection to the third content item. In other words, the second content item is connected to the third content item as well as to the first content item. The identification of the second content item may be carried out using any method known in the art, such as the methods described in U.S. Pat. No. 9,800,951 and in U.S. Patent Application Publication Nos. 2013/0198642, 2018/0176660, 2012/0183229, 2015/0121432, 2016/0127759, 2016/0191957 and 2016/0119691, all of which are incorporated by reference, for all purposes, as if fully set forth herein.

In some embodiments, the third and second content items are video content items, and the second connection between the third and second content items is selected from the group consisting of:
  A) sharing a common actor or a common actress,
  B) sharing a common director,
  C) sharing a common location of filming,
  D) sharing a common plot location, and
  E) sharing a common genre.

In some embodiments, the third content item is a video content item, and the connection between the third and second content items is selected from a group consisting of:
  A) a connection between the second content item and the third video content item as a whole,
  B) a connection between the second content item and a scene of the third video content item, and
  C) a connection between the second content item and a named entity appearing in the third video content item.

In the present example, the processor may identify the movie "Notting Hill" as a second content item, because both "Pretty Woman" and "Notting Hill" star Julia Roberts. As such, in the present example, the connection between the third content item and the second content item is that both content items share a common lead actress.

At step 176, which takes place during displaying of the third content item by the second content playing device, processor 108 executes instructions 126 and automatically determines a second textual title for the second content item, which is different from the first textual title for the second content item determined at step 166.

In some embodiments, the automatic determination of the second textual title at step 176 is based on the second connection between the third content item and the second content item. In the present example, in which the second connection is the shared lead actress Julia Roberts, the second textual title may be "Beautiful Julia Roberts stars in 'Notting Hill'".

In some embodiments, the automatic determination of the second textual title at step 176 includes automatically selecting the first textual title from the group of multiple textual titles for the second content item, described hereinabove with respect to step 156.

In some embodiments, the automatic determination of the second textual title at step 176 includes automatically, and in real-time—i.e. during displaying of the third content item, generating the second textual title. In some such embodiments, the second textual title may be generated based on a rule associated with the second connection between the third and second content items. In the present example, in which the second content item "Notting Hill" is selected based on the shared actress with the third content item "Pretty Woman", the rule may be "for a content item named <item_name> starring actress <actress_name>, generate the title 'Beautiful <actress_name> stars in <item_name>', and the resulting title would be "Beautiful Julia Roberts stars in 'Notting Hill'".

At step 178, which takes place during displaying of the third content item by the second content playing device, processor 108 executes instructions 128 and causes the second content playing device to display the second textual title for the second content item, thereby to propose the second content item to a user, which may be the same user or a different user.

In the present example, processor 108 would cause the television in Ruth's den (if the first and second content playing devices are the same), or the television in Ruth's bedroom (if the first and second content playing devices are different), to display the generated recommendation "Beautiful Julia Roberts stars in "Notting Hill"".

In some embodiments, at step 180, processor 108 receives a user request from the second user for viewing the second content item on the second content playing device. In the present example, Ruth or her husband David may press a button on a remote controller associated with the TV in the bedroom, selecting the recommendation to watch "Notting Hill".

Subsequently, at step 182, processor 108 causes displaying of the second content item by the second content playing device. In the present example, the TV in Ruth's bedroom would proceed to play "Notting Hill".

Reference is now made to FIG. 2A, which is a schematic block diagram of an embodiment of a device 200 for selecting enrichment data and a title therefor according to a second embodiment of the teachings herein.

As seen in FIG. 2A, the device 200 for selecting enrichment data and a title therefor is functionally associated a content playing device 202. The content playing device 202 may be any suitable content playing device, such as a television screen, a computer screen, a projector projecting video content onto a wall or a pull-down projector screen, and the like.

In some embodiments, the device 200 may be, or may include, a Set-Top Box. In some embodiments, the device 200 may be, or may include, a smart TV, in which case the content playing device may be the screen of the smart TV. In some embodiments, the content playing device 202 may be, or may include, a Set-Top Box. In some embodiments, the content playing device 202 may be, or may include, a smart TV.

In some embodiments, device 200 may be functionally associated with one or more databases 204 including content suitable for providing as enrichment data, such as a database of sports statistics suitable for providing as enrichment content, a database including biographical information and images of actors and actresses, a video clip database, and the like. In some embodiments, device 200 may be connected to, or form part of, a network which can be searched for enrichment data, such as the Internet, as indicated by arrow 206.

Device 200 includes a processor 208 and a storage medium 210, which is typically a non-transitory computer readable storage medium.

Processor 208 is in communication with the content playing device 202.

In some embodiments, the processor may be in direct communication with the content playing device 202. For example, when device 200 is a smart TV and the content playing device 202 is a screen of the smart TV, the processor 208 is in direct communication with the content playing device. As another example, the device 200 may be a Set-Top Box, which is in direct communication with a content playing device 202 to which it provides content.

In some embodiments, the processor may be in indirect communication with the content playing device 202, or may communicate with the content playing device via one or more intermediate devices. For example, when device 200 is a server, the processor may communicate with content playing devices 202 via a Set-Top Box corresponding to content playing device 202, which Set-Top Box functions as an intermediate device.

The storage medium 210 includes instructions to be executed by the processor 208, in order to carry out various steps of the method described herein below with respect to FIG. 2B. Specifically, the storage medium includes the following instructions:

instructions 212, that when executed by processor 208, cause displaying of a first content item by the content playing device 202;

instructions 214, that when executed by processor 208, automatically identify a second content item as having a connection to the first content item;

instructions 216, that when executed by processor 208, automatically generate a textual title for the second content item, the textual title being based on the connection between the first content item and the second content item; and instructions 218, that when executed by processor 208, cause proposing the second content item to a user consuming content items using the content playing device, which proposing includes displaying the textual title by the content playing device.

In some embodiments, the processor 208 executes the instructions 214, the instructions 216, and the instructions 218 simultaneously with the displaying of the first content item caused by execution of the instructions 212. Stated differently, in some embodiments, the second content item is identified as being connected to the first content item, the title for the second content item is generated, and the second content item is proposed to the user, all done during displaying of the first content item.

The second content item determined when instructions 214 are executed by processor 208 may be any suitable type of content item, and may include video data, an audio clip, textual data, a still picture, and/or a graphic animation.

In some embodiments, storage medium 210 includes additional instructions (not explicitly shown) to be executed by the processor 208, to cause displaying of the second content item by the content playing device in response to the user requesting the second content item, for example by providing, subsequent to the displaying of the textual title caused by executing instructions 218, a suitable command to processor 208 via a remote controller. The processor 208 executes the additional instructions to cause displaying of the second content item by the content playing device during, or subsequent to, the displaying of the first content item and subsequent to execution of instructions 218. Stated differently, the processor causes the content playing device to play the second content item following receipt of a suitable user command, during, or subsequent to, the displaying of the first content item and after displaying of the textual title of the second content item.

In some such embodiments, the instructions 216 include instructions to automatically change a default textual title associated with the second content item according to a rule associated with the connection between the first content item and the second content item, thereby to generate the textual title.

In some embodiment, the content playing device 202 may be a TV system, such that the first content item and/or the second content item are media content items.

A method for selecting enrichment data and a title therefor according to the second embodiment of the teachings herein, using the device of FIG. 2A, is now described with respect to FIG. 2B.

As seen, at step 252, processor 208 of device 200 executes instructions 212, and causes displaying of a first content item by a content playing device 202. In some embodiment, the first content item is a media content item. In some embodiments, the first content item is a non-media content item, for example displayed while the user is browsing the Internet. For example, at step 252, processor 208 may cause Harry's computer screen to display highlights from a football game between the teams 'New England Patriots' and 'Minnesota Vikings'.

At step 254, which takes place during displaying of the first content item by the content playing device, processor 208 executes instructions 214 and automatically identifies a second content item as a content item having a connection to the first content item. The identification of the second content item may be carried out using any method known in the art, such as the methods described in U.S. Pat. No. 9,800,951 and in U.S. Patent Application Publication Nos. 2013/0198642, 2018/0176660, 2012/0183229, 2015/0121432, 2016/0127759, 2016/0191957 and 2016/0119691, all of which are incorporated by reference, for all purposes, as if fully set forth herein.

The second content item identified at step 254 may be any suitable content item, and may include video data, an audio clip, textual data, a still picture, and/or a graphic animation.

In some embodiments, in a similar manner to that described hereinabove with respect to FIGS. 1A and 1B, the first and second content items are video content items, and the connection between the first and second content items is selected from the group consisting of:
  A) sharing a common actor or a common actress,
  B) sharing a common director,
  C) sharing a common location of filming,
  D) sharing a common plot location, and
  E) sharing a common genre.

In some embodiments, in a similar manner to that described hereinabove with respect to FIGS. 1A and 1B, the first content item is a video content item, and the connection between the first and second content items is selected from a group consisting of:
  A) a connection between the second content item and the first video content item as a whole,
  B) a connection between the second content item and a scene of the first video content item, and
  C) a connection between the second content item and a named entity appearing in the first video content item.

In some embodiments, the first content item and/or the second content item may be a non-media content item, for example when the user consumes the first content item while browsing the Internet.

In the present example, the processor may identify a textual biography of Tom Brady, the quarterback of the 'New England Patriots', entitled 'The Official Life of Tom Brady' as the second content item. As such, in the present example, the connection between the first content item and the second content item is that both content items are related to Tom Brady.

At step 256, which takes place during displaying of the first content item by the content playing device, processor 208 executes instructions 216 and automatically generates a textual title for the second content item, which is based on the connection between the first and second content items.

In some embodiments, the automatic generation of the textual title at step 256 includes automatically, and in real-time—i.e. during displaying of the first content item, generating the textual title based on a rule associated with the connection between the first and second content items.

In the present example, in which the second content item, a biography of QB Tom Brady is selected based on Tom Brady's success during the game between the 'New England Patriots' and the 'Minnesota Vikings' watched as the first content item, the rule may be "for a named entity <entity_name> described in text <text_name>, generate the title 'Read about <entity_name> in <text_name>', and the resulting title would be "Read about Tom Brady in 'The Official Life of Tom Brady'".

At step 258, which takes place during displaying of the first content item by the content playing device, processor 208 executes instructions 218 and causes the content playing device to display the textual title for the second content item, thereby to propose the second content item to the user.

In the present example, processor 208 would cause Harry's computer screen to display the generated recommendation "Read about Tom Brady in 'The Official Life of Tom Brady'".

In some embodiments, at step 260, processor 208 receives a user request from the user for viewing the second content item. In the present example, Harry may use his comptuer's mouse to click a hot-link associated with the generated recommendation, thereby selecting the recommendation to read "The Official Life of Tom Brady".

Subsequently, at step 262, processor 208 causes displaying of the second content item by the content playing device. In the present example, Harry's computer screen would proceed to display "The Official Life of Tom Brady".

Figure 3A:
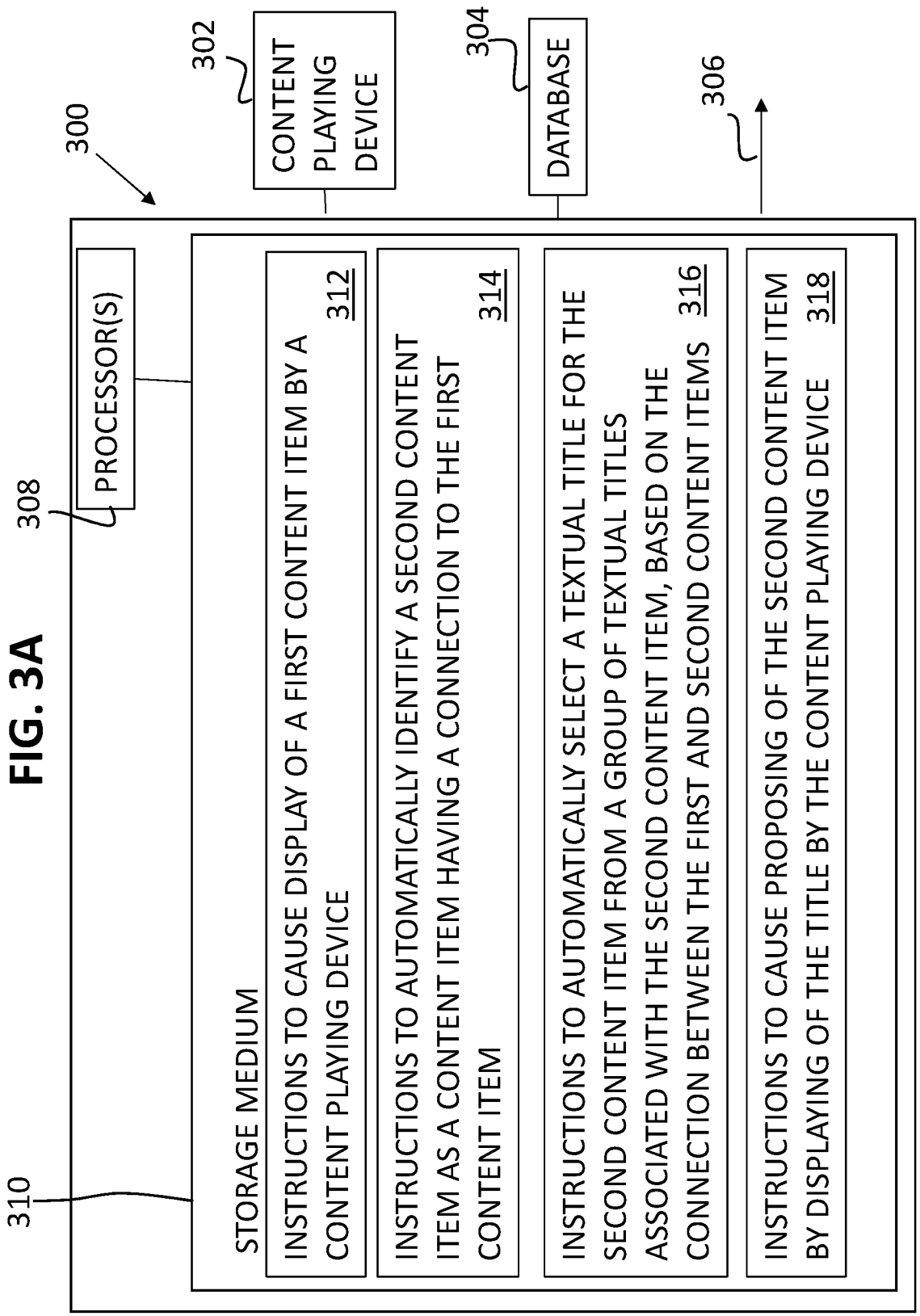
FIG. 3A is a schematic block diagram of an embodiment of a device for selecting enrichment data and a title therefor according to a third embodiment of the teachings herein.

Reference is now made to FIG. 3A, which is a schematic block diagram of an embodiment of a device 300 for selecting enrichment data and a title therefor according to a third embodiment of the teachings herein.

As seen in FIG. 3A, the device 300 for selecting enrichment data and a title therefor is functionally associated a content playing device 302. The content playing device 302 may be any suitable content playing device, such as a television screen, a computer screen, a projector projecting video content onto a wall or a pull-down projector screen, and the like.

In some embodiments, the device 300 may be, or may include, a Set-Top Box. In some embodiments, the device 300 may be, or may include, a smart TV, in which case the content playing device may be the screen of the smart TV. In some embodiments, the content playing device 302 may be, or may include, a Set-Top Box. In some embodiments, the content playing device 302 may be, or may include, a smart TV.

In some embodiments, device 300 may be functionally associated with one or more databases 304 including content suitable for providing as enrichment data, such as a database of sports statistics suitable for providing as enrichment content, a database including biographical information and images of actors and actresses, a video clip database, and the like. In some embodiments, device 300 may be connected to, or form part of, a network which can be searched for enrichment data, such as the Internet, as indicated by arrow 306.

Device 300 includes a processor 308 and a storage medium 310, which is typically a non-transitory computer readable storage medium.

Processor 308 is in communication with the content playing device 302.

In some embodiments, the processor may be in direct communication with the content playing device 302. For example, when device 300 is a smart TV and the content playing device 302 is a screen of the smart TV, the processor 308 is in direct communication with the content playing device. As another example, the device 300 may be a Set-Top Box, which is in direct communication with a content playing device 302 to which it provides content.

In some embodiments, the processor may be in indirect communication with the content playing device 302, or may communicate with the content playing device via one or more intermediate devices. For example, when device 300 is a server, the processor may communicate with content playing device 302 via a Set-Top Box corresponding to the content playing device 302, which Set-Top Box functions as an intermediate device.

The storage medium 310 includes instructions to be executed by the processor 308, in order to carry out various steps of the method described herein below with respect to FIG. 3B. Specifically, the storage medium includes the following instructions:

instructions 312, that when executed by processor 308, cause displaying of a first content item by the content playing device 302;

instructions 314, that when executed by processor 308, automatically identify a second content item as having a connection to the first content item;

instructions 316, that when executed by processor 308, automatically select a textual title for the second content item from a group of multiple textual titles associated with the second content item, where the selection is based on the connection between the first content item and the second content item; and instructions 318, that when executed by processor 308, cause proposing the second content item to a user consuming content items using the content playing device, which proposing includes displaying the textual title by the content playing device.

In some embodiments, the processor 308 executes the instructions 314, the instructions 316, and the instructions 318 simultaneously with the displaying of the first content item caused by execution of the instructions 312. Stated differently, in some embodiments, the second content item is identified as being connected to the first content item, the title for the second content item is selected, and the second content item is proposed to the user, all done during displaying of the first content item.

The second content item determined when instructions 314 are executed by processor 308 may be any suitable type of content item, and may include video data, an audio clip, textual data, a still picture, and/or a graphic animation.

In some embodiments, storage medium 310 includes additional instructions (not explicitly shown) to be executed by the processor 308, to cause displaying of the second content item by the content playing device in response to the user requesting the second content item, for example by providing, subsequent to the displaying of the textual title caused by executing instructions 318, a suitable command to processor 308 via a remote controller. The processor 308 executes the additional instructions to cause displaying of the second content item by the content playing device during, or subsequent to, the displaying of the first content item and subsequent to execution of instructions 318. Stated differently, the processor causes the content playing device to play the second content item following receipt of a suitable user command, during, or subsequent to, displaying of the first content item and after displaying of the textual title of the second content item.

In some embodiment, the content playing device 302 may be a TV system, such that the first content item and/or the second content item are media content items.

A method for selecting enrichment data and a title therefor according to the third embodiment of the teachings herein, using the device of FIG. 3A, is now described with respect to FIG. 3B.

As seen, at step 352, processor 308 of device 300 executes instructions 312, and causes displaying of a first content item by a content playing device 302. In some embodiment, the first content item is a media content item. In some embodiments, the first content item is a non-media content item, for example displayed while the user is browsing the Internet.

For example, at step 352, processor 308 may cause John's tablet screen to display the movie "E.T. the Extra Terrestrial".

At step 354, which takes place during displaying of the first content item by the content playing device, processor 308 executes instructions 314 and automatically identifies a second content item as a content item having a connection to the first content item. The identification of the second content item may be carried out using any method known in the art, such as the methods described in U.S. Pat. No. 9,800,951 and in U.S. Patent Application Publication Nos. 2013/0198642, 2018/0176660, 2012/0183229, 2015/0121432, 2016/0127759, 2016/0191957 and 2016/0119691, all of which are incorporated by reference, for all purposes, as if fully set forth herein.

The second content item identified at step 354 may be any suitable content item, and may include video data, an audio clip, textual data, a still picture, and/or a graphic animation.

In some embodiments, in a similar manner to that described hereinabove with respect to FIGS. 1A and 1B, the first and second content items are video content items, and the first connection between the first and second content items is selected from the group consisting of:
 A) sharing a common actor or a common actress,
 B) sharing a common director,
 C) sharing a common location of filming,
 D) sharing a common plot location, and
 E) sharing a common genre.

In some embodiments, in a similar manner to that described hereinabove with respect to FIGS. 1A and 1B, the first content item is a video content item, and the connection between the first and second content items is selected from a group consisting of:
 A) a connection between the second content item and the first video content item as a whole,
 B) a connection between the second content item and a scene of the first video content item, and
 C) a connection between the second content item and a named entity appearing in the first video content item.

In some embodiments, the first content item and/or the second content item may be a non-media content item, for example when the user consumes the first content item while browsing the Internet.

In the present example, the processor may identify the movie "Schindler's List" as the second content item. As such, in the present example, the connection between the first content item and the second content item is that both content items share a common director, Steven Spielberg.

At step 356, which takes place during displaying of the first content item by the content playing device, processor 308 executes instructions 316 and automatically selects a textual title for the second content item from a group of pre-defined textual titles for the second content item. The selected textual title is based on the connection between the first and second content items.

In some embodiments, each textual title in the group relates to an aspect of the second content item which may form a connection with other content items. In the present example, the group may include the textual titles:
 "Learn about the Holocaust in 'Schindler's List'" ("Schindler's List" is set during the Holocaust);
 "Learn History from 'Schindler's List'" ("Schindler's List" is a historical drama);
 "Steven Spielberg's creativity in 'Schindler's List'" (Steven Spielberg directed "Schindler's List"); and
 "Human Kindness with 'Liam Neeson'" (Liam Neeson stars in "Schindler's List" as the Jew-saving Oskar Schindler).

The title that would be selected in the present example is the title that emphasizes the connection to Steven Spielberg, namely "Steven Spielberg's creativity in 'Schindler's List'".

At step 358, which takes place during displaying of the first content item by the content playing device, processor 308 executes instructions 318 and causes the content playing device to display the textual title for the second content item, thereby to propose the second content item to the user.

In the present example, processor 308 would cause John's tablet screen to display the generated recommendation "Steven Spielberg's creativity in 'Schindler's List'".

In some embodiments, at step 360, processor 308 receives a user request from the user for viewing the second content item. In the present example, John may touch the screen of his tablet to select a hot-link associated with the generated recommendation, thereby selecting the recommendation to watch "Schindler's List".

Subsequently, at step 362, processor 308 causes displaying of the second content item by the content playing device. In the present example, John's table screen would proceed to display "Schindler's list".

Definitions

This disclosure, including the description of the invention and the claims, should be interpreted according to the definitions below.

In case of a contradiction between the definitions provided herein and other sections of this disclosure, these definitions should prevail.

In case of a contradiction between the definitions provided herein and a definition or a description in any other document, including in another document included in this disclosure by reference, these definitions should prevail, even if the definition or the description in the other document is commonly accepted by a person of ordinary skill in the art.

1. "content"—information and experiences that are directed towards an end-user or audience.
2. "content item"—a stand-alone unit of content that can be referred to and uniquely identified by a single reference and can be retrieved and displayed independently of other content. For example, a movie, a TV series, a still image, or a paragraph of text.
3. "media content item"—a content item that contains media content. For example, a movie, a TV program, an episode of a TV series, a video clip, an animation, an audio clip, or a still image.
4. "non-media content item"—a content item that is not a media content item. For example, a paragraph of text.
5. "audio content item"—a media content item that contains only an audio track hearable using a speaker or a microphone.
6. "video content item"—a media content item that contains a visual track viewable on a screen. A video content item may or may not additionally contain an audio track.
7. "audio" and "aural" are used as synonyms herein.
8. "video" and "visual" are used as synonyms herein.
9. "audio channel" and "audio track" are used as synonyms herein. Both refer to an audio component of a media content item.
10. "video channel" and "video track" are used as synonyms herein. Both refer to a video component of a media content item. A still image is a special case of video track.
11. "content playing device"—a device that is capable of playing or displaying at least some content items. For example, a graphic engine that is capable of displaying paragraphs of text, a combined video/audio player that is capable of playing in parallel both the video channel and the audio channel of at least some media content items.
12. "media playing device"—a device that is capable of playing or displaying at least some media content items. For example, an audio-only player that is capable of playing at least some audio content items, a video-only player that is capable of playing the video track of at least some video content items, a combined video/audio player that is capable of playing in parallel both the video channel and the audio channel of at least some media content items.
13. "playing a media content item"—outputting at least one of a video channel and an audio channel of the media content item to a visual output device (for example a TV screen) or an audio output device (for example a speaker or headphones). If the media content item is a still image, then playing it means outputting the still image to a visual output device. If the media content item is a video content item that has both a video channel and an audio channel, then playing it means outputting both the video channel and the audio channel to a visual output device and an audio output device, respectively. Pausing a video content item in the middle of playing is considered playing it. Also, showing the last frame of a video content item after it was played to its end is considered playing the video content item.
14. "displaying a media content item"—outputting a video channel of the media content item to a visual output device (for example a TV screen). If the media content item is a still image, then displaying it means outputting the still image to a visual output device. Pausing a video content item in the middle of playing it is considered displaying it. Also, showing the last frame of a video content item after it was played to its end is considered displaying the video content item.
15. "displaying a non-media content item"—outputting a visual image of the non-media content item to a visual output device (for example outputting a visual image of a paragraph of text to a computer screen).
16. "entity"—something that exists as itself, as a subject or as an object, actually or potentially, concretely or abstractly, physically or not. It need not be of material existence. In particular, abstractions and legal fictions are regarded as entities. There is also no presumption that an entity is animate, or present. Specifically, an entity may be a person entity, a location entity, an organization entity, a media content item entity, a topic entity or a group entity. Note that the term "entity" does not refer to the text referencing the subject or the object, but to the identity of the subject or the object.
17. "person entity"—a real person entity, a character entity or a role entity.
18. "real person entity"—a person that currently lives or that had lived in the past, identified by a name (e.g. John Kennedy) or a nickname (e.g. Fat Joe).
19. "character entity"—a fictional person that is not alive today and was not alive in the past, identified by a name or a nickname. For example, "Superman", "Howard Roark", etc.
20. "role entity"—a person uniquely identified by a title or by a characteristic. For example "the $23^{rd}$ president of the United States", "the oldest person alive today", "the tallest person that ever lived", "the discoverer of the penicillin", etc.
21. "location entity"—an explicit location entity or an implicit location entity.
22. "explicit location entity"—a location identified by a name (e.g. "Jerusalem", "Manhattan $6^{th}$ Avenue", "Golani Junction", "the Dead Sea") or by a geographic locator (e.g. "ten kilometers north of Golani Junction", "100 degrees East, 50 degrees North").
23. "implicit location entity"—a location identified by a title or a by a characteristic (e.g. "the tallest mountain peak in Italy", "the largest lake in the world").
24. "organization entity"—an organization identified by a name (e.g. "the United Nations", "Microsoft") or a nickname (e.g. "the Mossad").
25. "media content item entity"—A media content item identified by a name (e.g. "Gone with the Wind" is a media content item entity that is a movie, and "Love Me Do" is a media content item entity that is a song).
26. "topic entity"—a potential subject of a conversation or a discussion. For example, the probability that Hillary Clinton will win the presidential election, the current relations between Russia and the US, the future of agriculture in OECD countries.
27. "group entity"—a group of entities of any type. The different member entities of a group may be of different types.
28. "nickname of an entity"—any name by which an entity is known which is not its official name, including a pen name, a stage name and a name used by the public or by a group of people to refer to it or to address it.
29. "named entity"—An entity that is identified by a name or a nickname and not by other types of description. For example, "Jerusalem" is a named entity, but "the tallest building in Jerusalem" is not a named entity (even though it is a perfectly valid entity, that is uniquely identified).
30. "NER" or "Named Entity Recognition"—The task of recognizing the occurrence of a reference to a named entity within a text, without necessarily identifying the identity of the specific named entity referred to by the reference.
31. "NED" or "Named Entity Disambiguation"—The task of determining the identity of a specific named entity referred to by a reference to a named entity occurring in a text, when the reference can match the identities of multiple candidate named entities. The disambiguation results in assigning one of the identities of the multiple candidate named entities to the reference occurring in the text. Note that the task of Named Entity Disambiguation also includes the initial step of determining that an occurrence of a reference to a named entity is ambiguous and requires disambiguation. However, the task of Named Entity Disambiguation does not include the determining of the identity of a specific named entity when the occurrence of the reference to the named entity in the text can only match the identity of a single named entity, as there is no need for disambiguation in such case.
32. "subtitles"—Text derived from either a transcript or a screenplay of a dialog or commentary in movies, television programs and the like, displayable on the screen while the movie or program is being played. Subtitles can either be a translation of text spoken in the movie or program into a different language, or a rendering of text in the same language spoken in the movie or program. Subtitles may include added information to help viewers who are deaf or hard of hearing to follow the dialog or commentary, or to help people who cannot understand the spoken dialogue or commentary, or who have accent recognition problems. The subtitles can either be pre-rendered with the video or separately provided as either graphics or text to be rendered and overlaid by a rendering device.
33. "OCR" or "Optical Character Recognition"—The mechanical or electronic conversion of images of typed, handwritten or printed text into machine-encoded text, whether from a scanned document, a photo of a document, a scene-photo (for example the text on signs and billboards in a landscape photo) or from subtitles text superimposed on an image (for example from a television broadcast).
34. "speech-to-text conversion"—A process by which spoken language is recognized and translated into machine-encoded text by computers. It is also known as "automatic speech recognition" (ASR), "computer speech recognition", or just "speech to text" (STT).
35. "video shot" (also referred to herein as "shot")—A continuous sequence of frames within a video content item that were continuously recorded by the same camera. A video shot is a physical entity that does not deal with the semantic meaning of its content.
36. "video scene" (also referred to herein as "scene")—A collection of one or more semantically-related and temporally adjacent video shots depicting and conveying a high-level concept or story. In other words, a video scene is a semantic entity that is a continuous portion of a video content item and has an independent identity of its own. For example, one news item of a news program or a car chase scene of an action movie. Typically there are multiple video scenes within a video content item, but a video scene may also be the only one within its video content item, as may be the case for a short music video clip.
37. "video segment" (also referred to herein as "segment")—A continuous portion of a video content item that is strictly smaller than the enclosing video content item. A video segment may coincide with a video shot or with a video scene, but does not have to. That is—a video segment may be a single shot, multiple shots, a portion of a shot, multiple shots plus a portion of a shot, a single scene, multiple scenes, a portion of a scene, or multiple scenes plus a portion of a scene. It should be emphasized that a video segment extracted from its enclosing video content item and put back into a library or collection of video content items as a stand-alone video item, is no longer considered to be a video segment and becomes a video content item of its own. This is so even if the enclosing video content item from which the segment was extracted is available in the same library or collection. That is, a car chasing scene extracted from a movie and posted as a short video in YouTube is no longer a video segment for the purpose of the present solution.
38. "content component" or "content unit"—A content item or a video segment.
39. "title of a content item"—Text associated with the content item that provides some information related to the content item. The title of a content item may be displayed when recommending the content item to a user. The text of a title of a content item, or a portion of it, may serve as a hot link for accessing the content item by selecting it (e.g. by clicking it using a mouse or by touching it in a touch screen).
40. "strictly larger"—Larger and not equal to.
41. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.
42. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat".

Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are used synonymously.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for enhancing user experience of users consuming content items using content playing devices, comprising:
   a) causing displaying a first content item by a first content playing device;
   b) during said displaying of said first content item by said first content playing device:
      i) automatically identifying a second content item as a content item having a first connection to said first content item,
      ii) automatically determining a first textual title for said second content item, and
      iii) causing proposing said second content item to a first of said users, said proposing including displaying said first textual title by said first content playing device;
   c) causing displaying a third content item by a second content playing device; and
   d) during said displaying of said third content item by said second content playing device:
      i) automatically identifying said second content item as a content item having a second connection to said third content item,
      ii) automatically determining a second textual title for said second content item, said second textual title being different from said first textual title, and
      iii) causing proposing said second content item to a second of said users, said proposing including displaying said second textual title by said second content playing device.

2. The method of claim 1, wherein said first content playing device and said second content playing device are the same content playing device.

3. The method of claim 1, wherein said second content playing device is different from said first content playing device.

4. The method of claim 1, wherein said first of said users and said second of said users are the same user.

5. The method of claim 1, wherein said first of said users and said second of said users are different users.

6. The method of claim 1, further comprising at least one step selected from a group consisting of:
   i) during said displaying of said first content item by said first content playing device and subsequent to said displaying of said first textual title by said first content playing device, in response to said first of said users requesting said second content item, causing displaying said second content item by said first content playing device, and
   ii) during said displaying of said third content item by said second content playing device and subsequent to said displaying of said second textual title by said second content playing device, in response to said second of said users requesting said second content item, causing displaying said second content item by said second content playing device.

7. The method of claim 1, wherein at least one statement selected from a group consisting of the following statements is true:
   i) said automatically determining of said first textual title for said second content item is based on said first connection, and
   ii) said automatically determining of said second textual title for said second content item is based on said second connection.

8. The method of claim 1, wherein at least one statement selected from a group consisting of the following statements is true:
   i) said automatically determining of said first textual title includes automatically selecting said first textual title from a group of multiple textual titles for said second content item, and
   ii) said automatically determining of said second textual title includes automatically selecting said second textual title from said group of multiple textual titles for said second content item.

9. The method of claim 1, wherein at least one statement selected from a group consisting of the following statements is true:
   i) said automatically determining of said first textual title includes automatically generating said first textual title during said displaying of said first content item by said first content playing device, and
   ii) said automatically determining of said second textual title includes automatically generating said second textual title during said displaying of said third content item by said second content playing device.

10. The method of claim 9, wherein at least one statement selected from a group consisting of the following statements is true:
    i) said automatically generating of said first textual title includes automatically changing a default textual title according to a rule associated with said first connection, and
    ii) said automatically generating of said second textual title includes automatically changing said default textual title according to a rule associated with said second connection.

11. The method of claim 1, wherein said first, second and third content items are video content items, and wherein at least one connection selected from a group consisting of said first connection and said second connection is selected from a group consisting of:
    A) sharing a common actor or a common actress,
    B) sharing a common director,
    C) sharing a common location of filming,
    D) sharing a common plot location, and
    E) sharing a common genre.

12. The method of claim 1, wherein said first and said third content items are first and third video content items, and wherein at least one connection selected from a group consisting of said first connection and said second connection is selected from a group consisting of:
    A) a connection between said second content item and said first or said third video content item as a whole,
    B) a connection between said second content item and a scene of said first or said third video content item, and
    a connection between said second content item and a named entity appearing in said first or said third video content item.

* * * * *